May 16, 1933.  A. F. EMMORD  1,909,256
BRAKE SHOE
Filed Sept. 7, 1932

Inventor
ALBERT F. EMMORD
By John Wagner
Attorney

Patented May 16, 1933

1,909,256

UNITED STATES PATENT OFFICE

ALBERT F. EMMORD, OF BALTIMORE, MARYLAND

BRAKE SHOE

Application filed September 7, 1932. Serial No. 632,041.

The object of the invention is to provide a brake shoe with a quickly detachable and replaceable friction facing, constructing the same in a manner to afford positive anchoring of the said facing against braking thrust and also in a manner to prevent scoring of the brake drum or wear upon the shoe proper when the friction facing fabric or composition becomes worn through.

With the above and other objects in view as will occur as this description progresses, reference will be had to the accompanying drawing forming a part of the specification, and wherein.

Figure 1:
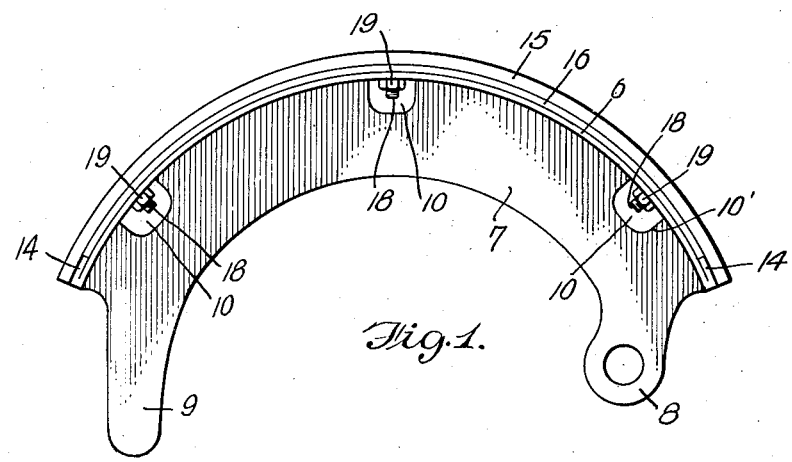
Fig. 1 is a view in side elevation of the invention.
Figure 4:
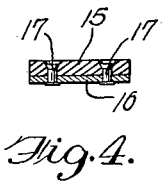
Fig. 4 is a transverse vertical sectional view through the facing and backing.

In the drawing, reference number 6 designates the rim of a brake shoe, and 7 the inwardly extended web thereof, the latter being located substantially centrally of the former and extending longitudinally thereof. These parts may be made of iron or steel. The web is provided with the usual pivot mounting 8 and operating arms 9. At intervals, adjacent the rim 6, the web 7 is provided with apertures 10 and adjacent these apertures the rim is provided with slots 11 and opening 12.

The opening 12 is located substantially centrally of the center aperture 10 and while the slots 11 are coincident with the outer apertures 10, they are not coextensive therewith being shorter than the width of the apertures 10 whereby the lower ends 11' of the walls of the slots project beyond the lower side walls 10' of the apertures 10 for a purpose to be described. Stop lugs 14 are provided in any desired manner at the ends of the brake shoe rim beyond the slots 11 to take the thrust of the removable facing member, which latter comprises a conventional friction facing fabric or composition 15 secured to a brass or other relatively soft metal backing 16, by soft metal countersunk rivets 17 in conventional manner. Suitably secured to and extending radially of the shoe rim 6 are threaded stud bolts 18 which are passed through the said slots 11 and opening 12. While the backing 16 is flexible, it is at the same time preformed to substantially conform to the curvature of the rim 6, flexibility being provided principally to insure the backing 16 with its attached facing 15 being drawn into close contact and conformity with the rim 6 by the nuts 19 which are engaged beneath the rim 6.

Figure 2:
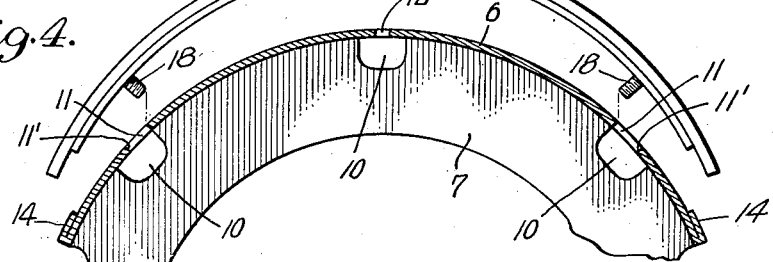
Fig. 2 is a similar view of parts juxtaposed for assembly.
Figure 3:
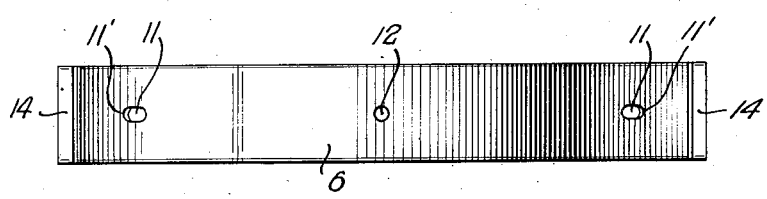
Fig. 3 is a top plan view of the shoe with the friction facing and its backing removed.
Figure 5:
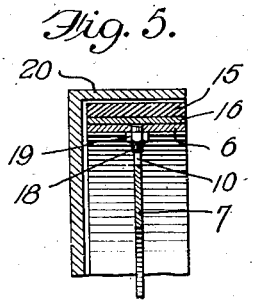
Fig. 5 is a vertical sectional view through fragments of the brake shoe and brake drum.
Figure 6:
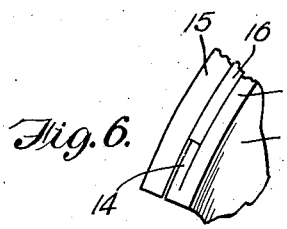
Fig. 6 is an enlarged view in side elevation of a fragment of Fig. 1.

The end walls 11' of the rim slots 11 being spaced from the walls 10' of the web apertures 10 permits the nuts 19 to clear the walls 10' when being rotated. The slots 11 are long enough to permit the outer bolts 18 being readily entered therethrough without any, or at least, material flexing of the backing 16, as will be noted in Fig. 2, and when the facing 15 and backing 16 have been applied as in Fig. 1, the ends of the backing 16 engage the inner ends of the stop lugs 14 and these lugs 14 provide positive anchorage for the ends of the backing 16 to take the circumferential thrust thereof regardless of whether any of the thrust is being taken by the bolts 18. The friction facing 15 extends beyond the ends of the backing 16 to overlie the stop lugs 14.

It is important that the stop lugs 14, whether they are in the form of attached blocks or whether an integral part of the rim 6, should be of less thickness than the backing 16 so as not to extend outwardly sufficiently to engage the brake drum 20 when the facing 15 has worn through. Being of iron or steel, they would under that condition score and otherwise damage the braking surface of the brake drum, and by reducing the amount of projection thereof, the relative softer metal backing 16 comes into contact with the brake drum 20, rather than the thrust lugs 14, when the friction facing 15 becomes worn through, thereby preventing damage to either the brake drum or the brake shoe proper and avoiding the necessity of remachining these parts.

The stop lugs 14 being of less thickness than the backing 16, permit the ends of the overlying facing 15 to flex out of the plane of the major portion of the facing 15 so that braking action is all applied to the friction facing 15.

Obviously, the invention is as applicable to clutches and like friction devices as to brakes.

What I claim is:

1. In a device of the character described, a brake shoe, a non-brake-drum-scoring backing removably secured thereto, a composition friction facing carried by the said backing, and thrust means of less thickness than the backing provided on the shoe.

2. In a device of the character described, a brake shoe, a non-brake-drum-scoring backing substantially conforming to the contour of the shoe and being removably secured to the shoe, a composition friction facing carried by the said backing and thrust members of less thickness than the backing on said shoe beyond the ends of the backing and adapted to take the thrust of said backing.

3. In a device of the character described, a brake shoe having a curved outer face, a non-brake-drum-scoring backing substantially conforming to the contour of the shoe and being removably secured to the shoe, a friction facing carried by the backing, and thrust members on said shoe and of less thickness than the backing, said facing extending beyond the ends of the backing and overlying the thrust members.

4. In a device of the character described, a brake shoe having a curved outer face provided with slots and an intermediate aperture, a backing substantially conforming to the contour of the shoe, radial studs on the backing received within the slots and opening, securing means on the ends of the studs, thrust means on the shoe adjacent the ends of the backing, and a friction facing carried by the backing and extending over said thrust means.

5. In a device of the character described, a brake shoe having a curved outer rim and a central web extending longitudinally of the rim, the rim and web having coincident apertures, a non-brake-drum-scoring backing substantially conforming to the contour of the rim, radial bolts carried thereby and passing through the rim apertures, nuts on said bolts located within the web apertures, stops on the rim of less thickness than the backing located to take the thrust of the ends of the backing, and a friction facing secured to the backing and extending beyond the ends thereof and overlying the said stops.

In testimony whereof, I affix my signature.

ALBERT F. EMMORD.